UNITED STATES PATENT OFFICE.

CHARLES F. COOPER, OF CLEVELAND, OHIO.

COMPOSITION OF MATTER FOR COATING METALS.

1,169,931.   Specification of Letters Patent.   Patented Feb. 1, 1916.

No Drawing.   Application filed July 9, 1913.   Serial No. 778,096.

*To all whom it may concern:*

Be it known that I, CHARLES F. COOPER, a citizen of the United States, residing at Cleveland, in the county of Cuyahoga and State of Ohio, have invented a new and useful Composition of Matter for Coating Metals, of which the following is a specification.

This composition of matter is a metal filler. It is further adapted as a "ground" or "binder" preparatory to graining metals. As such it constitutes the "distinct preparation" referred to in the last sentence of the specification to my application for U. S. Letters Patent, filed June 5th, 1913, Serial No. 771,958.

It consists preferably, of the following ingredients combined in substantially the proportions stated, viz: forty-two to fifty per cent. (42–50%) dry color, thirteen to seventeen per cent. (13–17%) lime, thirteen to seventeen per cent. (13–17%) varnish, ten to eighteen per cent. (10–18%) turpentine, two per cent. (2%) salt. These ingredients are to be thoroughly mixed by agitation. While any mode is permissible I find the following very satisfactory: First, stir the dry color and varnish until a smooth thick paste has been effected. Next, mix the lime and salt together in the dry state. Thereafter, add the turpentine to this dry mixture of lime and salt and agitate violently. Finally, bring together this compound and the paste first mentioned to establish a homogeneous compound. When the preparation is concluded, a fluid having the consistency of a high grade varnish should have been produced.

My "filler," "binder," or "ground" as the case may be presents to a striking degree one of the advantageous properties emphasized in my earlier application already identified. This property is its rapid drying propensity. A single coat of this preparation requires but one or two hours thus shortening the baking period as compared with the ordinary japanning process by somewhat over six hours. A coat of my composition may be either air-dried or baked, the latter being preferable when facilities therefor are available chiefly by reason of the added measure of time which may be saved. A single coat when baked usually requires only an hour to dry.

Another feature which especially commends my composition for commercial usage is its tenacity as a binder. Its bits upon metals including iron, steel and aluminum is in the nature of a molecular adherence and consonantly not a friable coating. As vouching for this assertion it may be remarked that when properly applied it is capable of resisting sharp localized blows without chipping; and when upon a flexible base neither bending, twisting or indiscriminate torsional strains can fracture it. The successive application of a number of coats effects a better finish without detracting in any wise from the qualities just now given. The aggregate coating may be sanded or pumice-stoned down to the metal itself.

As an initial coat or binder for artificial graining of metals this composition is unexcelled. When baking can be resorted to a number of coats may be applied commensurate with the quality of finish desired, and thereafter the graining ground comprising the subject matter of my aforementioned application employed merely to surface it. My "graining ground" does not permit of baking though it will stand a heat test bordering on 130°. If on the other hand the slower air-drying process is followed the two different compositions may be applied alternately. With consideration of all fair and reasonable equivalents, it may be added that lime in any form will answer, white rock or air slaked lime being perhaps preferable. Either benzin or the cheaper naphtha may be substituted for turpentine. For the high grade varnish which it is advisable to use, any hard oil or even gloss oil may be substituted. Certain tar products and asphaltum can also occasionally satisfy. The pigment may be either any lead color, a wet or a dry color.

As will be readily appreciated by all conversant with the art no precisely fixed proportions can be assigned the various ingredients. Certain less soluble dry colors require a larger per cent. of dissolving, ingredients. The salt too, which is primarily added to lend the glaze, is difficult to dissolve in turpentine and hence its quantity is dependent upon the amount of turpentine. Certain of the dry ingredients in combination are less easily cut than others and for this due allowance should be made. Incidently this preparation permits of use as a paint for galvanized iron or tin.

My invention being thus described with sufficient thoroughness, what I desire to secure by Letters Patent and therefore claim specifically, is:

1. The herein described composition of matter for coating metals, comprising forty-two (42) to fifty (50) per cent. pigment, thirteen (13) to seventeen (17) per cent. lime, thirteen (13) to seventeen (17) per cent. varnish, twelve (12) to eighteen (18) per cent. turpentine, and two (2) per cent. common salt.

2. The herein described composition of matter for coating metals, comprising a pigment, lime, varnish, turpentine and salt in substantially the proportions given.

Signed by me, this 8th day of July, 1913.

CHARLES F. COOPER.

Attested by—
W. C. BRACKEN.
B. R. FREESON.

Copies of this patent may be obtained for five cents each, by addressing the "Commissioner of Patents, Washington, D. C."